United States Patent

Kropp et al.

[11] Patent Number: 5,980,594
[45] Date of Patent: *Nov. 9, 1999

[54] USE OF REACTION PRODUCTS OF POLYOLEFINS AND OXIDES OF NITROGEN OR MIXTURES OF OXIDES OF NITROGEN AND OXYGEN AS ADDITIVES FOR FUELS

[75] Inventors: Rudolf Kropp, Limburgerhof; Eckhard Hickmann, Dannstadt-Schauernheim; Klaus Ebel, Lampertheim; Wolfgang Günther, Mettenheim; Hans Peter Rath, Grünstadt; Harald Schwahn, Wiesloch, all of Germany

[73] Assignee: BASF Aktiengesellschaft, Ludwigshafen, Germany

[*] Notice: This patent is subject to a terminal disclaimer.

[21] Appl. No.: 08/765,822

[22] PCT Filed: Jul. 18, 1995

[86] PCT No.: PCT/EP95/02803

§ 371 Date: Jan. 21, 1997

§ 102(e) Date: Jan. 21, 1997

[87] PCT Pub. No.: WO96/03479

PCT Pub. Date: Feb. 8, 1996

[30] Foreign Application Priority Data

Jul. 21, 1994 [DE] Germany .............................. 44 25 835

[51] Int. Cl.⁶ ....................................................... C10L 1/22
[52] U.S. Cl. ................................ 44/432; 44/413; 564/512
[58] Field of Search ........................ 44/413, 432; 564/512

[56] References Cited

U.S. PATENT DOCUMENTS

| 3,255,248 | 6/1966 | Saessenguth et al. |
|---|---|---|
| 3,282,983 | 11/1966 | Lachowicz et al. |
| 3,328,465 | 6/1967 | Spiegler . |
| 3,449,437 | 6/1969 | Lee . |
| 3,510,531 | 5/1970 | Larkin et al. |
| 3,576,742 | 4/1971 | Honnen et al. |
| 3,681,463 | 8/1972 | Lee . |
| 3,689,561 | 9/1972 | Lee et al. |
| 3,799,751 | 3/1974 | Lachowicz et al. |
| 4,159,996 | 7/1979 | Love et al. .............................. 564/511 |
| 5,350,429 | 9/1994 | Mohr et al. ............................. 564/511 |
| 5,879,420 | 3/1999 | Kropp et al. ............................. 44/412 |

FOREIGN PATENT DOCUMENTS

| 652 991 | 3/1965 | Belgium . |
|---|---|---|
| 1 437 041 | 7/1966 | France . |
| 2 687 159 | 8/1993 | France . |
| 36 11 230 | 10/1987 | Germany . |
| 1 010 410 | 11/1965 | United Kingdom . |

Primary Examiner—Jerry D. Johnson
Attorney, Agent, or Firm—Oblon, Spivak, McClelland, Maier & Neustadt, P.C.

[57] ABSTRACT

Reaction products of polymers of $C_2$–$C_6$-olefins having an average degree of polymerization P of from 5 to 100 and oxides of nitrogen or mixtures of oxides of nitrogen and oxygen are used as additives for fuels, in particular for fuels for gasoline engines.

5 Claims, No Drawings

USE OF REACTION PRODUCTS OF POLYOLEFINS AND OXIDES OF NITROGEN OR MIXTURES OF OXIDES OF NITROGEN AND OXYGEN AS ADDITIVES FOR FUELS

BACKGROUND OF THE INVENTION

1. Field of the Invention

The present invention relates to the use of reaction products of polymers of $C_2$–$C_6$-olefins having an average degree of polymerization P of from 5 to 100 and oxides of nitrogen or mixtures of oxides of nitrogen and oxygen as additives for fuels, and to fuels which contain these reaction products and are intended for gasoline engines. The present invention furthermore relates to nitro-containing alkenes and aminoalkanes which are derived from these reaction products, their use as additives for fuels and for lubricants and fuels for gasoline engines and lubricants which contain these additives.

2. Discussion of the Background

The carburettor and intake system of gasoline engines as well as injection systems for fuel metering in gasoline and diesel engines are contaminated by impurities which are caused by dust particles from the air, uncombusted hydrocarbon residues from the combusting space and crank case vent gases passed into the carburettor.

The residues shift the air/fuel ratio during idling and in the lower part-load range so that the mixture becomes richer, the combustion is more incomplete and in turn the amounts of uncombusted or partially combusted hydrocarbons in the exhaust gases become larger and the gasoline consumption increases.

It is known that, in order to avoid these disadvantages, fuel additives can be used for keeping valves and carburettors or injection systems clean. (M. Rossenbeck in Katalysatoren, Tenside, Mineralöladditive, Editors J. Falbe and U. Hasserodt, page 223 et seq., G. Thieme Verlag, Stuttgart, 1978).

Depending on the mode of action but also on the preferred site of action of such detergent additives, a distinction is now made between two generations of such assistants.

The first generation of additives could only prevent the formation of deposits in the intake system but could not remove existing deposits, whereas the additives of the second generation can do both (keep-clean and clean-up effect) and can do so because of their excellent heat stability, in particular in zones of relatively high temperatures, ie. in the intake valves.

The molecular structural principle of fuel detergents can generally be described as the linking of polar structures with generally high molecular weight, nonpolar or lipophilic radicals.

Members of the second generation of additives are often products based on polyisobutenes in the nonpolar moiety. Among these in turn, additives of the polyisobutylamine type are particularly noteworthy.

U.S. Pat. No. 3,576,742 (1) describes products of branched long-chain aliphatic olefins, for example polypropylene, polyisobutylene or copolymers or ethylene and isobutylene, and oxides of nitrogen as detergents for lubricants.

SUMMARY OF THE INVENTION

It is an object of the present invention to provide fuel additives, especially for fuels for gasoline engines, having an improved action. Starting from polyolefin, it is intended in particular to prepare, in a simple, one-stage reaction, a polyolefin derivative which can be used as a fuel additive and can be prepared in a controllable and reproducible manner.

We have found that this object is achieved by the use of the reaction products, defined at the outset, as fuel additives.

DETAILED DESCRIPTION OF THE PREFERRED EMBODIMENTS

It was surprising that the reaction of the polymers of $C_2$–$C_6$-olefins having an average degree of polymerization P of from 5 to 100 with oxides of nitrogen or mixtures of oxides of nitrogen and oxygen gives a product which has excellent properties as a fuel additive although the product contains no basic N group. An advantage over the two-stage process used to date for the preparation of (amine-containing) fuel additives based on polyolefins is the simple, one-stage method of preparation.

The $C_2$–$C_6$-olefin may be ethylene, propene, 1-butene, 2-butene, isobutene, 1,3-butadiene, 1-pentene, 2-pentene, 2-methyl-1-butene, 2-methyl-2-butene, 1,3-pentadiene, 1-hexene, 2-hexene, 3-hexene, 2-methyl-1-pentene, 2-methyl-2-pentene, 2-methyl-3-pentene, 2-methyl-4-pentene, 3-methyl-1-pentene, 3-methyl-2-pentene, 2-ethyl-1-butene, 3,3-dimethyl-1-butene, 1,3-hexadiene, 2,4-hexadiene, 1,5-hexadiene or 1,3,5-hexatriene. Mixtures of the stated olefins may also be used. Propene, 1-butene, 2-butene, isobutene, 1,3-butadiene or mixtures thereof are preferred.

In a particularly preferred embodiment, the fuel additives used are reaction products which are based on polymers of isobutene, and up to 50, preferably up to 30, % by weight of the isobutene may be replaced by other $C_2$–$C_6$-olefins, in particular by propene, 1-butene, 2-butene or 1,3-butadiene or a mixture thereof, as comonomers.

The polymerization of the stated $C_2$–$C_6$-olefins is carried out as a rule by conventional methods. Owing to chain termination reactions, the polymers have terminal ($\alpha$), $\beta$ and internal double bonds, the $\beta$ and in particular the terminal double bonds being the reaction centers for the reaction with the oxides of nitrogen.

The average degree of polymerization P is from 5 to 100, preferably from 8 to 80, in particular from 10 to 60, especially from 15 to 40. As always in the case of such polymerizations, polymers having a certain range of degrees of polymerization is obtained. However, with regard to the properties of the reaction products with oxides of nitrogen or mixtures of oxides of nitrogen and oxygen, the scatter has no detectable effect so that all that is important is the average degree of polymerization P, which can be continuously determined and controlled by viscosity measurements even during the polymerization.

In correlation with the average degree of polymerization P, the polyolefins described are of from 10 to about 600, preferably from 24 to about 320, in particular from 40 to about 240, carbon atoms and have number average molecular weights of from 140 to 8,400, preferably from 330 to 4,500, in particular from 560 to 3,400.

Suitable oxides of nitrogen for the reaction to give the products described are in particular nitric oxide (NO), nitrogen dioxide ($NO_2$), dinitrogen trioxide ($N_2O_3$), dinitrogen tetraoxide ($N_2O_4$), mixtures of these oxides of nitrogen with one another and mixtures of these oxides of nitrogen with oxygen, in particular NO with oxygen and $NO_2$ with oxygen. Where oxygen is present, it accounts for from 1 to 70, in particular from 5 to 50, % by volume of the mixture with the oxides of nitrogen. The mixture of the oxide of nitrogen and oxygen may also contain inert gases, eg. nitrogen; this occurs, for example, when mixtures of an oxide of nitrogen and air are used.

The reaction to give the products described can be carried out under atmospheric or superatmospheric pressure, batchwise or continuously.

In order to achieve quantitative conversion, the oxides of nitrogen are added in a molar ratio of polyolefins to oxide of nitrogen of from 1:2 to 1:4, preferably from 1:2.2 to 1:3.3. A greater excess has no adverse effect.

The temperature is not critical. It may be varied from −30 to 150° C. The reaction is preferably carried out at from −10 to 100° C., in particular from 25 to 80° C.

The reaction is carried out in an advantageous manner in an inert organic solvent. For example, aliphatic hydrocarbons, such as isooctane or an n-alkane mixture (eg. $C_{10}$–$C_{13}$), chlorinated hydrocarbons, such as methylene chloride, carbon tetrachloride or chlorobenzene, ethers such as diethyl ether, tetrahydrofuran, dioxane or tert-butyl methyl ether, esters such as ethyl acetate or methyl benzoate, amides such as dimethylformamide or N-methylpyrrolidone, and acids, such as acetic acid, are suitable for this purpose. Since the reaction products are to be used as fuel additives, the solvent used is advantageously the same as that in which they are also added to the fuel. In general, the amounts of solvent are from 50 to 90% by weight of the total batch. However, it is also possible to work in the absence of a solvent.

The addition of a small amount of water (from about 0.2 to 1% by weight, based on polyolefin used) in order to hydrolyze any nitrite ester formed has no adverse effect.

A reaction batch is generally worked up either by heating briefly to 40–50° C. under reduced pressure or by stirring with water and then carrying out a phase separation. Both measures are intended to remove residues of oxides of nitrogen from the reaction mixture.

As a rule, the reaction product described is obtained in the form of a mixture of different nitro-containing alkanes, particularly when $NO_2$ is used or concomitantly used as the oxide of nitrogen, this mixture containing, as main components, the compounds of the general formulae I and II

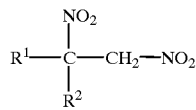
(I)

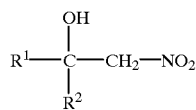
(II)

where $R^1$ is a long-chain linear or branched alkyl radical of 8 to 600, preferably 22 to 320, in particular 38 to 240, carbon atoms and $R^2$ is hydrogen or $C_1$–$C_3$-alkyl.

$R^1$ corresponds to the abovementioned structures for $C_2$–$C_6$-olefin polymers used. $R^2$ is preferably hydrogen, ethyl or, in particular, methyl.

Compounds of the general formulae III and IV are often found here as further components (where $R^2$ is methyl):

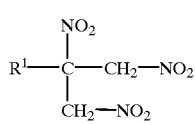
(III)

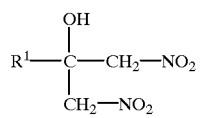
(IV)

The following compounds V and VIII can be detected as byproducts in some cases, depending on the oxides of nitrogen or mixtures of oxides of nitrogen and oxygen which are used:

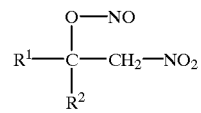
(V)

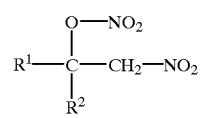
(VI)

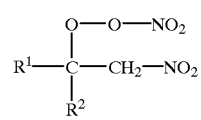
(VII)

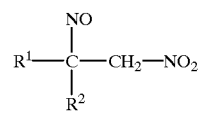
(VIII)

As a rule, the compounds I to IV form the essential components of the reaction product described. The compounds I and II generally account for from 25 to 90, in particular from 40 to 85, % by weight of the reaction product described.

The structures IX to XVI which are similar to the compounds I to VIII and are based on polyolefins having β double bonds may occur as further structures:

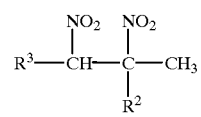
(IX)

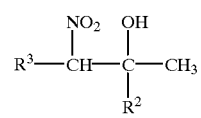
(X)

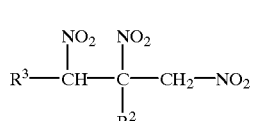
(XI)

-continued

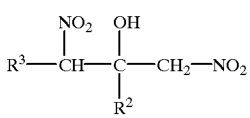

(XII)

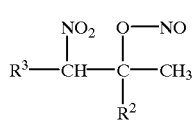

(XIII)

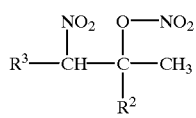

(XIV)

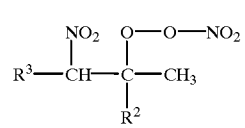

(XV)

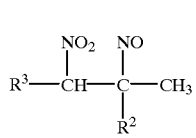

(XVI)

Here, $R^3$ is radical $R^1$ which is one carbon atoms or one $CH_2$ group shorter.

The present invention also relates to reaction products of the polyolefins described and oxides of nitrogen and oxygen, which reaction products have been converted into nitro-containing alkenes after their formation by elimination with bases, and to their use as fuel additives and lubricant additives.

Particularly suitable structures for such secondary products are the compounds XVII and XVIII

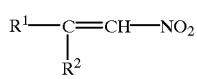

(XVII)

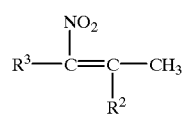

(XVIII)

XVII originally being formed from a polyolefin having a terminal double bond and XVIII originally being formed from a polyolefin having a β double bond. Furthermore, the hydroxy-containing compounds II, IV, X and XII may be byproducts of such subsequent elimination reactions. As a rule, a mixture of different species in which XVII and/or XVIII often form the main components is present as the product of the elimination reaction.

Such elimination reactions are carried out under the usual conditions. For example, alkali metal hydroxides, such as NaOH or KOH, alkali metal alcoholates, such as sodium methylate, sodium ethylate, sodium isopropylate or potassium tert-butylate, or in particular alkali metal carbonates or bicarbonates, such as sodium or potassium carbonate or sodium or potassium bicarbonate, are used as bases.

The nitro-containing alkenes thus obtained are suitable as intermediates for the preparation of corresponding poly-isobuteneamines effective as fuel additives and lubricant additives, or are themselves effective as fuel additives and also as lubricant additives.

Owing to their properties as detergents and dispersants, the described reaction products of polyolefins and oxides of nitrogen or mixtures of oxides of nitrogen and oxygen are used in fuels, in particular in fuels for gasoline engines.

If the reaction products described which are nitroalkanes are hydrogenated by conventional methods to give the corresponding aminoalkanes, compounds which are likewise effective as fuel additives and lubricant additives are obtained. Such aminoalkanes mainly have the following structures XIX and XXVI.

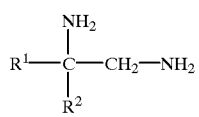

(XIX)

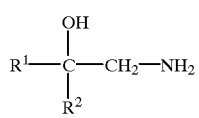

(XX)

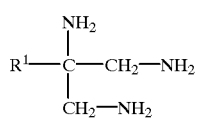

(XXI)

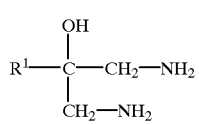

(XXII)

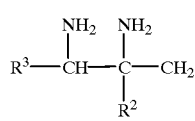

(XXIII)

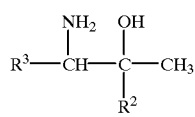

(XXIV)

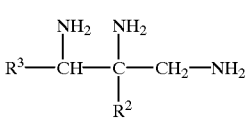

(XXV)

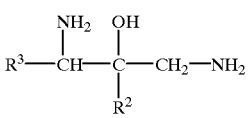

(XXVI)

Corresponding aminoalkanes having the structures XXVII and XXVIII can also be prepared from the secondary products XVII and XVIII:

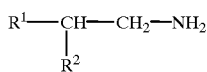 (XXVII)

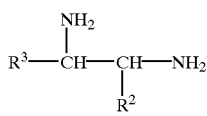 (XXVIII)

By suitable functionalization of the double bond in XVII or XVIII, such as an addition reaction with amines $HNR^4R^5$ or alcohols $R^4$—OH, or cleavage to give aldehydes and an addition reaction of amines $HNR^4R^5$ with these aldehydes and subsequent hydrogenation, the following structures XXIX to XXXIV are also obtainable:

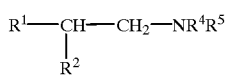 (XXIX)

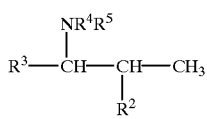 (XXX)

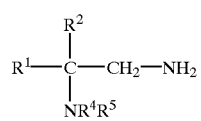 (XXXI)

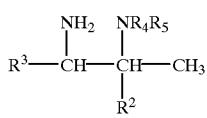 (XXXII)

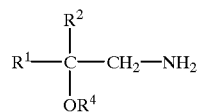 (XXXIII)

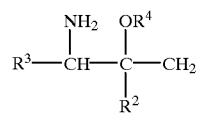 (XXXIV)

$R^4$ and $R^5$ are organic radicals generally and $R^5$ may furthermore by hydrogen, $C_1$–$C_{30}$-alkyl, $C_2$–$C_{30}$-alkenyl, $C_5$–$C_8$-cycloalkyl, $C_7$–$C_{18}$-aralkyl and unsubstituted or substituted $C_6$–$C_{14}$-aryl being meant here in particular.

The reaction products described are added to the fuels preferably in an amount of from 10 to 5,000 ppm, in particular from 50 to 1,000 ppm.

If it is intended to utilize primarily dispersant properties of the novel substance, they may also be combined with conventional detergents as additional additives.

The detergent component used in the mixture with the novel substances as dispersants may be in principle any known product suitable for this purpose, as described, for example, in J. Falbe and U. Hasserodt, Katalysatoren, Tenside and Mineralöadditive, G. Thieme Verlag Stuttgart, 1978, page 223 et eq. or in K. Owen, Gasoline and Diesel Fuel Additives, John Wiley & Sons, 1989, page 23 et seq.

N-containing detergents, for example compounds which contain an amino or amido group, are preferably used. Polyisobutylamines according to EP-A 0 244 616, ethylenediaminetetraacetamides and/or ethylenediaminetetraacetimides according to EP-A 0 188 786 or polyetheramines according to EP-A 0 356 725 are particularly suitable, the definitions in these publications being hereby incorporated by reference.

If it is intended to utilize primarily the detergent action of the reaction products described, these substances may also be combined with carrier oils. Such carrier oils are known, and carrier oils based on polyglycol, for example corresponding ethers and/or esters, as described in U.S. Pat. No. 5,004,478 and DE-A 38 38 918, are particularly suitable. Polyoxyalkylenemonools having terminal hydrocarbon groups (U.S. Pat. No. 4,877,416) or carrier oils as disclosed in DEA 41 42 241 may also be used.

Suitable fuels for gasoline engines are leaded and in particular unleaded regular and premium grade gasoline. The gasolines may also contain components other than hydrocarbons, for example alcohols, such as methanol, ethanol or tert-butanol, and ethers, eg. methyl tert-butyl ether. In addition to the reaction products described, the fuels also contain, as a rule, further additives, such as corrosion inhibitors, stabilizers, antioxidants and/or further detergents.

Corrosion inhibitors are generally ammonium salts of organic carboxylic acids which, when the starting compounds have an appropriate structure, tend to form films. Amines for reducing the pH are also frequently present in corrosion inhibitors. Heterocyclic aromatics are generally used for protecting nonferrous metals from corrosion.

The products were tested for suitability as fuel additives by means of engine tests; in tests according to CEC-F-04-A-87 in test stands, the keep-clean effect in intake valves (1.2 1 Opel Kadett engine) was tested.

PREPARATION EXAMPLES

In the examples which follow, percentages are by weight.

EXAMPLE 1

In a stirred flask, 254 g of oligopropene having an average molecular weight of 1168 (p=28) and a bromine number of 12.6 and 300 g of tert-butyl methyl ether were treated with 25 g (0.54 mol) of nitrogen dioxide at 40° C. in the course of 2 hours while stirring. After the excess nitrogen dioxide had been stripped off with nitrogen, 100 g of water were added to the reaction mixture and stirring was carried out for 2 hours at 50–60° C. The phase separation gave 505 g of an organic layer, from which 278 g of product were obtained after the solvent had been distilled off.

The elemental analysis gave:

80.2% C; 13.4% H; 4.5% O; 1.6% N.

The $^1$H-NMR spectrum showed, as main components, the compounds 1,2-dinitrooligopropane and 1-nitro-2-hydroxyoligopropane in a weight ratio of 52:48.

EXAMPLE 2

In a stirred flask, 720 g of polyisobutene having a high content of β double bonds and a low content of terminal double bonds (Indopol® H 100, average molecular weight 930, P=17, bromine number 22.4) and 820 g of Mihagol® M (n-paraffin mixture, $C_{10}$–$C_{13}$) were stirred and were treated with 115 g (2.5 mol) of nitrogen dioxide at 40° C. in the course of 4 hours. After the excess nitrogen dioxide had been stripped off with nitrogen, 350 g of water were added to the reaction product and stirring was carried out for 3 hours at 60° C. After phase separation, stirring with water was carried out again and the organic phase was then briefly distilled under reduced pressure. 1,570 g of product were obtained as a clear solution. 94% conversion of the polyisobutene used was determined by means of preparative chromatography.

The elemental analysis gave the following result:

81% C; 14.1% H; 3.0% O; 1.2% N.

When the reaction was carried out in tert-butyl methyl ether and the solvent was distilled off after the working up, the solvent-free product gave the following analysis:

80.0% C; 13.4% H; 4.7% O; 2% N.

EXAMPLE 3

In a stirred flask, 500 g of a copolymer of 7 0% of isobutene and 30% of 1,3-butadiene (average molecular weight 700, bromine number 60) and 890 g of tert-butyl methyl ether were stirred and were treated with 240 g (5.2 mol) of nitrogen dioxide at from 30 to 48° C. in the course of 2.5 hours. After the excess nitrogen dioxide had been stripped off with nitrogen, 700 g of water were added to the reaction product solution and stirring was carried out for 3 hours at 55° C. Phase separation gave 1,449 g of an organic layer, from which 645 g of product were obtained after the solvent had been distilled off. The elemental analysis gave:

69.5% C; 10.5% H; 14.4% O; 5.4% N.

USE EXAMPLES

Keep-clean test in intake valves

The engine tests were carried out using an Opel Kadett 1.2 1 engine (according to CEC F-04-A-87).

Fuel used: European unleaded premium grade

| Example No. | Additive from Example No. | Dose [ppm] | Intake valve deposits [mg]* | | | |
|---|---|---|---|---|---|---|
| | | | Valve 1 | Valve 2 | Valve 3 | Valve 4 |
| 4 | 1 | 200 | 50 (278) | 36 (132) | 38 (191) | 178 (180) |
| 5 | 1 | 400 | 12 (278) | 13 (132) | 15 (191) | 23 (180) |
| 6 | 2 | 200 | 4 (277) | 2 (175) | 3 (183) | 5 (337) |

*Values without additvie (blank test) in parentheses

The results clearly show the valve-cleaning effect of the novel additives.

We claim:

1. A process for preparing aminoalkanes which comprises:

reacting a polymer of propene, 1-butene, 2-butene, isobutene, 1,3-butadiene or mixtures thereof or of isobutene, where up to 50% by weight of the isobutene may be replaced by other $C_2$–$C_6$-olefins as comonomers, having an average degree of polymerization of from 5 to 100, with oxides of nitrogen or mixtures of oxides of nitrogen and oxygen, to obtain a reaction product;

directly hydrogenating said reaction product under hydrogenation conditions so as to obtain a mixture of aminoalkanes consisting essentially of the formulas XIX, XXI, XXIII and/or XXV:

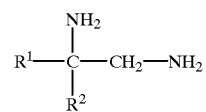
(XIX)

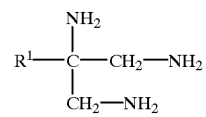
(XXI)

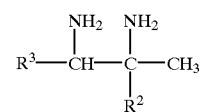
(XXIII)

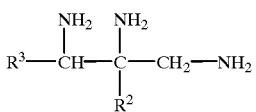
(XXV)

where $R^1$ is a long-chain linear or branched alkyl radical of 8 to 600 carbon atoms, $R^2$ is hydrogen or $C_1$–$C_3$-alkyl and $R^3$ is a radical $R^1$ shortened by a carbon atom or by a $CH_2$ group.

2. An amino alkane of formula XXI and/or XXV obtained by the process of claim 1.

3. A fuel composition for gasoline engines, containing a fuel and a keep-clean and clean-up effective amount of a reaction product as defined by claim 2.

4. An amino alkane of the formula XXI and/or XXV

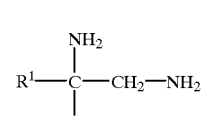
(XXI)

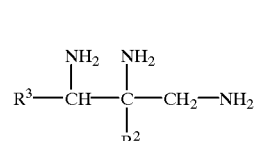
(XXV)

where $R^1$ is a long-chain linear or branched alkyl radical of 8 to 600 carbon atoms, $R^2$ is hydrogen or $C_1$–$C_3$-alkyl, and $R^3$ is a radical $R^1$ shortened by a carbon atom or by a $CH_2$ group.

5. A fuel composition for gasoline engines, containing a fuel and a keep-clean and clean-up effective amount of an amino alkane of claim 4.

* * * * *